United States Patent
Walley

(10) Patent No.: US 9,667,322 B2
(45) Date of Patent: May 30, 2017

(54) METHOD AND SYSTEM FOR WIRELESS POWER TRANSFER CALIBRATION

(71) Applicant: Avago Technologies General IP (Singapore) Pte. Ltd., Singapore (SG)

(72) Inventor: John Walley, Ladera Ranch, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 999 days.

(21) Appl. No.: 13/760,924

(22) Filed: Feb. 6, 2013

(65) Prior Publication Data

US 2014/0184150 A1    Jul. 3, 2014

Related U.S. Application Data

(60) Provisional application No. 61/747,057, filed on Dec. 28, 2012.

(51) Int. Cl.
   *H02J 7/00* (2006.01)
   *H04B 5/00* (2006.01)
   *H02J 5/00* (2016.01)

(52) U.S. Cl.
   CPC ............ *H04B 5/0037* (2013.01); *H02J 5/005* (2013.01); *H04B 5/0031* (2013.01); *H04B 5/0081* (2013.01)

(58) Field of Classification Search
   CPC .. H04B 5/0037; H04B 5/0031; H04B 5/0081; H02J 5/005

USPC .......................................................... 320/108
See application file for complete search history.

(56) References Cited

U.S. PATENT DOCUMENTS

| | | | | |
|---|---|---|---|---|
| 8,686,684 | B2 * | 4/2014 | Turner | H02J 7/025 320/108 |
| 2009/0140691 | A1 * | 6/2009 | Jung | H02J 7/025 320/108 |
| 2011/0248673 | A1 * | 10/2011 | Aerts | H02J 7/0044 320/108 |
| 2012/0032522 | A1 * | 2/2012 | Schatz | H02J 5/005 307/104 |

* cited by examiner

*Primary Examiner* — Jack Chiang
*Assistant Examiner* — Brandon Bowers
(74) *Attorney, Agent, or Firm* — Sterne, Kessler, Goldstein & Fox P.L.L.C.

(57) ABSTRACT

In a WPT system, varying parameters, such as coupling coefficient, may cause the system to fall out of resonance and/or tuning. By monitoring one or more signals within a coil module of the WPT device, this detuning can be detected. Moreover, the WPT system can retune itself by modifying one or more parameters in a transmitting WPT device and/or a receiving WPT device. For example, coil circuits in the transmitting and/or receiving WPT devices can be configured to allow for adjusting of effective capacitance, effective inductance, load resistance, and/or load inductance. In addition, frequency can be modified to permit adjusting power transfer efficiency.

20 Claims, 11 Drawing Sheets

METHOD AND SYSTEM FOR WIRELESS POWER TRANSFER CALIBRATION

CROSS-REFERENCE TO RELATED APPLICATIONS

This application claims the benefit of U.S. provisional application 61/747,057, filed Dec. 28, 2012, which is incorporated herein by reference in its entirety.

FIELD

The disclosure relates to wireless power transfer, and more specifically performing calibration within a wireless power transfer system.

BACKGROUND

Related Art

Wireless power transfer stations, such as power pads, have recently become known. Conventional wireless power transfer systems are calibrated during manufacturing to account for component tolerances, manufacturing tolerances, etc. However, the conventional systems are particularly susceptible to power transfer efficiency changes during field operation.

For example, the efficiency of power transfer in conventional wireless power transfer systems is dependent on several factors, including the alignment of the transmitting coil and the receiving coil, the resonance of the system, the tuning of the system, and drift caused by temperature and/or mechanical movement, among others. When one or more of these factors strays further from optimal, power transfer efficiency may significantly degrade. Conventional systems are incapable of the detecting and correcting for these changes.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
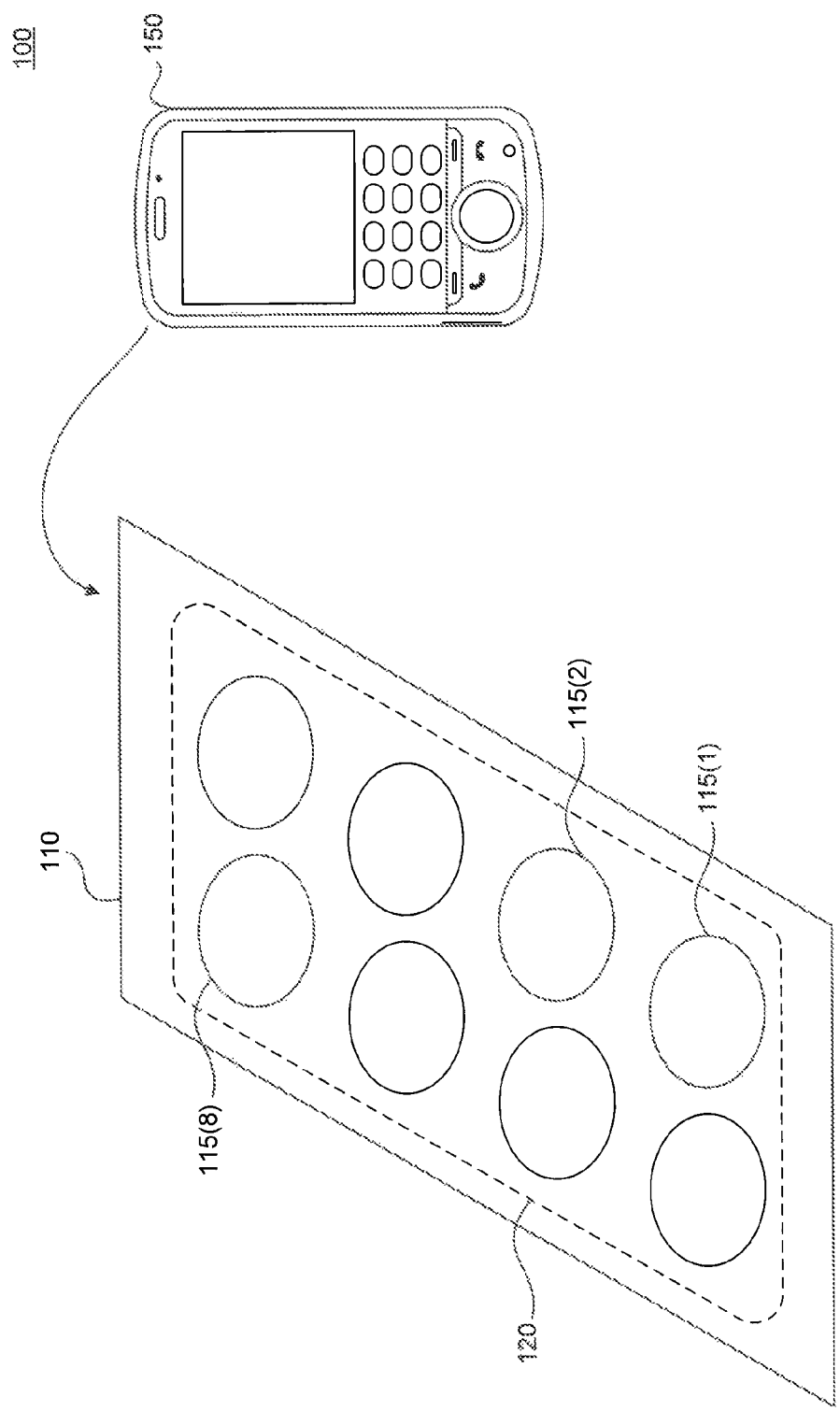
FIG. 1 illustrates an exemplary wireless power transfer environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Further, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the following description is to be described in terms of wireless power transfer (WPT) devices, hose skilled in the relevant art(s) will recognize that this description may be applicable to many various charging and/or communication methods without departing from the spirit and scope of the present disclosure.

An Exemplary Wireless Power Transfer Environment

FIG. 1 illustrates an exemplary wireless power transfer environment 100. The environment 100 includes a wireless power transfer station (hereinafter "power station") 110. The power station 110 includes at least one coil 115 (115(1)-115(8) in the example of FIG. 1) arranged in a grid or matrix pattern. The coils send and receive signals between a wirelessly-chargeable device 150, which may include one or more coils for wirelessly sending and receiving signals. The exchanged signals can include data, commands and/or other communications, and can be used to transfer power from the power station 110 to the device 150. In an embodiment, the power station 110 may also include an outer coil 120, discussed in detail below.

When a user of the device 150 seeks to wirelessly charge a battery or other power storage device within the device 150, the user moves the device 150 to be within proximity of the power station 110. After an initialization and setup period, the power station 110 loads power transfer signals onto one or more of its coils 115 and transmits those signals to the device 150. The device receives the signals from the coils 115 of the power station 110 and extracts power therefrom. In this manner, the power station 110 functions as a power transmitter and the device 150 functions as a power receiver. In embodiments, the wireless power transfer is implemented as a magnetic coil-to-coil power transfer using a transmit coil and a receive coil. The transmit coil is excited with an AC current to produce an alternating magnetic field that induces a secondary AC current in the receive coil. The secondary current can then be rectified using a diode bridge or other type of rectifier so as to produce a DC voltage that can be stored in a battery, or used to power receiver device circuits directly.

Exemplary Wireless Power. Transfer Device

Figure 2:
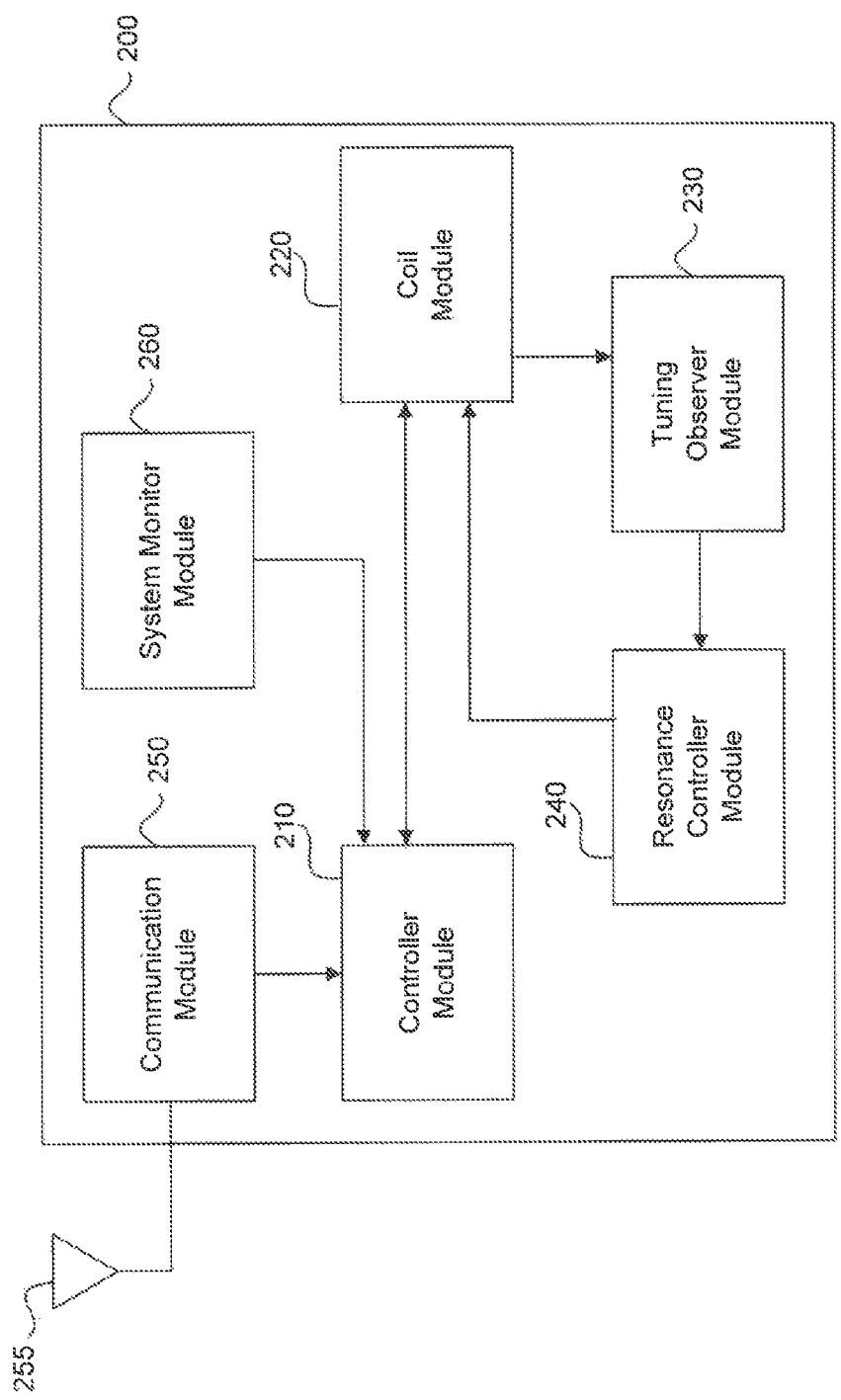
FIG. 2 illustrates a block diagram of an exemplary wireless power transfer (WPT) device.

FIG. 2 illustrates a block diagram of an exemplary wireless power transfer (WPT) device 200. The WPT device 200 includes a controller module 210, a coil module 220, a tuning observer module 230, and a resonance controller module 240.

The controller module 210 processes incoming and outgoing power signals, as well as performs general control of the WPT device 200. The coil module 220 facilitates power transfer to/from another WPT device. Specifically, the coil module 220 modulates power transfer signals onto one or more coils for transferring power to a power receiving device, and/or is loaded with a power transfer signal from the environment for receiving power. The tuning observer module 230 is capable of detecting whether the WPT device 200 is properly tuned, and the resonance controller module 240 adjusts the WPT device 200 to correct tuning, when necessary, as will be discussed in further detail below.

In order to maintain efficient power transfer between the WPT device 200 and another WPT device, the WPT device 200 should maintain a high degree of tuning and high resonance. Therefore, very precise matching is needed between the WPT device 200 and the other WPT device in the system. In this regard, the WPT system can be greatly improved through its ability to detect changes in the tuning, and to automatically adjust its parameters to retune as needed.

Calibration Coordination

As discussed above, there may be many reasons why it is beneficial for the WPT device 200 to perform calibration while in the field. However, there are several circumstances and/or events during which calibration should not be performed. For example, the presence of foreign objects its the vicinity of the WPT device 200 and/or the coil module 220 will skew calibration. Therefore, any results derived from calibrating in the presence of a foreign object will have negative effects on device tuning and transfer efficiency. As a result, it is important to detect when these calibration-prohibiting events occur, and to perform calibration outside of these events.

There may be any number of events that can trigger calibration of the WPT device 200. For example, the controller module 210 may determine that transfer efficiency is lower than expected, the communication module 250 may detect proximity of a wirelessly-chargeable device using out-of-band communication, the controller module 210 may receive a user-input instruction to initiate calibration, the controller module 210 may receive an "out-of-tune" notification from the tuning observer module 230, the coil module 220 may forward a request received from a wirelessly-chargeable device to perform calibration, and/or the controller module 210 may receive a calibration request from a wirelessly-chargeable device via an out-of-band communication from the communication module 250, among others. Other internal or external triggers may be used to initiate calibration. However, once the controller module 210 becomes aware that calibration is needed, the controller module 210 sets a calibration flag and begins receiving system details from a system monitor module 260.

The system monitor module 260 performs several system diagnostic functions in order to detect various events that may prohibit calibration. For example, the system monitor module 260 may perform foreign object detection to detect undesired field contaminants on or near a surface of the WPT device 200. The system monitor module 260 may also perform system diagnostics to confirm that the WPT device 200 is functioning properly. The system monitor module 260 may perform any number of other event detections for determining whether calibration can be performed. If the system monitor module 260 determines that a calibration-prohibitive event is occurring, the system monitor module 260 can notify the controller module 210 to delay calibration. Once the system monitor module 260 detects that no calibration-prohibitive event is occurring, the system monitor module 260 notifies the controller module 210 that calibration may proceed.

When the controller module 210 determines that calibration may not proceed, the controller module 210 can attempt to remedy the event that is prohibiting calibration. A first type of events that may prevent calibration are internal events (occurrences/functionality of the WPT device 200 itself). In these scenarios, the controller module 210 may use the diagnostic information received from the system monitor module 260 to adjust one or more components of the WPT device 200 to correct these situations. If the event cannot be remedied through device reconfiguration, the controller module 210 may determine the WPT device 200 to be in a faulty operational state. In this case, the controller module 210 may cause the coil module 220 to transmit an "out-of-service" error notification to any nearby receiving devices and/or cause the communication module 250 to issue the out-of-service error notification to a central server using out-of-band communication protocols. By notifying the central server, repair/replacement can be scheduled and performed on the non-operational WPT device 200.

A second type of events that may prevent calibration are environment events (events that occur outside of the WPT device 200 and the receiving device). The system monitor module 260 may be capable of detecting one or more environmental events. For example, the system monitor module 260 may include foreign object detection capabilities to detect the presence of foreign objects in the vicinity of the WPT device 200 that may negatively affect the calibration. When such an environmental event is detected, the controller module 210 may cause the coil module 220 to send a notification signal to a receiver device to cause the receiver device to display a notification. Alternatively, the controller module 210 may cause the communication module 250 to transmit the notification signal using out-of-band communication protocols. The notification may be such as to notify a user of the receiving device to remedy the event, such as "Please Remove Debris From Power Transfer Surface." Even in circumstances where the exact environmental event cannot be determined, a notification signal can still be generated and forwarded to the receiving device to provide a general instruction, such as "Please Ensure That ONLY The Charging Device Is In Contact With The Power Transfer Surface."

A third type of events that may prevent calibration are receiver device events (events that occur within the circuitry/operation of the receiver device). These events may be identified by the system monitor module 260 by ruling out internal and environmental events and/or by receiving diagnostic or other information from the receiver device over the WPT or out-of-band communication systems. In order to perform an accurate calibration of the WPT device 200, nearby receiving devices must behave in a stable manner. One preferred way to ensure stability is to make the receiver device leave the magnetic field of the WPT device 200. This can effectively be achieved by reducing current in the receiver device coil(s) to zero or almost zero. Consequently, the controller module 210 may communicate with the receiver device using out-of-band communication via the communication module 250 in order to negotiate "turning off" the receiver device's coil(s). Once the timing and duration have been determined for "turning off" the receiver device's coil, the receiver device can stop the current passing through the coil(s) using a circuit open/close switch during the agreed-upon time. The switch may be a simple switch, a transistor, an adjustable resistor, or other circuit device capable of temporarily stopping or substantially stopping current through the coil(s). This will effectively remedy the receiver device event preventing calibration.

Once the controller module 210 determines that calibration may proceed, the controller module 210 may initiate other system modules, such as the tuning observer module 230 and the resonance controller module 240, to carry out calibration functionality. Such calibration may include observing a tuning of the wireless power transfer system and adjusting that tuning based on device and environment conditions. In this manner, calibration can be accurately performed during field operation, and events that would otherwise skew calibration results can be avoided.

Observability

As discussed above, in order to maintain a high degree of tuning, the tuning observer module 230 monitors various aspects of the WPT device 200 in order to detect whether it is properly tuned.

Figure 3A:
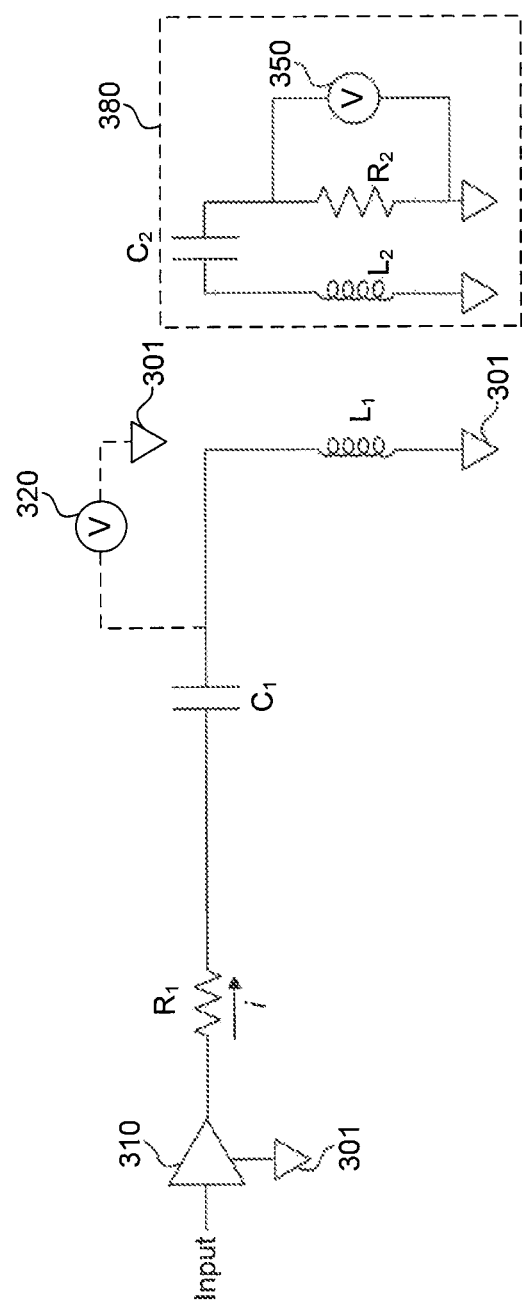
FIGS. 3A-3D illustrates a circuit diagram of an exemplary coil module according to an embodiment along with various tuning observer module configurations according to various embodiments.

FIG. 3A illustrates a circuit diagram of an exemplary coil module 300 according to an embodiment along with various tuning observer module configurations according to various embodiments. The coil module 300 includes a resistor R1 and a coil L1, and may represent an exemplary embodiment of the coil module 220.

In the coil module circuit 300, an input signal passes through amplifier 310. The amplified signal is then loaded onto coil L1 via resistor R1 and a capacitor C1. The amplifier 310 and coil L1 are each connected to a ground terminal 301. Although the coil module 300 depicts a serially-connected LRC circuit, those skilled in the relevant art(s) will recognize that a parallel LRC circuit can likewise be used to achieve substantially similar results. It should also be noted that the circuit will include parasitic capacitances inherent to the various circuit elements that will alter the behavior of the LRC circuit from expected.

In an embodiment, the tuning observer module 230 measures the current through R1 in order to detect resonance. Resonance occurs at particular frequency when the impedance of L1 cancels that of capacitance C1, causing the current i and the voltage across the coil L1 to spike in amplitude, thereby maximizing the magnetic field generated by L1. As stated, resonance is frequency sensitive, and therefore narrowband relative to the frequency of the driving input signal. Therefore, if the frequency of the input signal is offset relative to the actual resonant frequency of the circuit, then the current will be noticeably lower than if it were at actual resonance. In another embodiment, the tuning observer module 230 includes a voltage detector 320 connected to a node following the capacitor C1, where the voltage detector 320 detects the voltage across the coil L1 and therefore an amplitude spike that occurs at resonance.

In another embodiment, the tuning observer module 230 detects both the current over the resistor R1 and the voltage at the node, and compares a phase of the detected current signal to a phase of the detected voltage signal. When the WPT device 200 is at resonance, then the phase angle between the phase of the detected current signal and that of the detected voltage signal should be approximately zero degrees. If the WPT device 200 is not at resonance, then the phases will differ, which may trigger the need for tuning adjustments to be made.

In an embodiment, the tuning observer module 230 may include a magnetic field detection circuit 380 to measure the current of the WPT device 200. The magnetic field detection circuit 380 includes a sniffing coil L2 connected in series to a capacitor C2 and a resistor R2. A voltage detector 350 is connected in parallel to the resistor R2. The sniffing coil L2 detects the magnetic field generated by the radiating coil L1 in the coil module circuit 300 in order to detect the current.

In another embodiment, the current of the signal in the coil module circuit 300 is detected by measuring the voltage across any of the active elements. For example, the tuning observer module 230 may measure the voltage across capacitor C1. It may then determine the current passing through the capacitor using the well-known equation $I = C \cdot dv(t)/dt$. Using a similar method, and similarly well-known equations, the current can also be determined by measuring the voltage across the inductor L1.

There may be several other parameters worth observing in order to aid the calibration. For example, the system monitor module 260 may use its foreign object detection capabilities to detect/calculate the effects of parasitic capacitance caused by those objects. The system monitor module 260 may also include a sniffing coil to detect the magnetic field being transmitted from the WPT device 200. The results of this detection can be used during calibration to ensure that the WPT device 200 is transmitting a desired amount of field strength. This can be particularly important for compliance with SAR (specific absorption rating) safety levels—emissions standards relating to acceptable heat/radiation levels of a WPT device.

Controllability

Depending on the value of the various parameters detected by the tuning observer module 230, the tuning observer module 230 may issue a notification to the resonance controller module 240 that the WPT device 200 is not properly tuned, and needs adjustment. Upon receipt of the notification, the resonance tuning module 240 can adjust one or more properties of the WPT device 200 (such as, for example, in the coil module 220) in order to bring the WPT module 200 back to resonance. It should be noted that, in order to achieve resonance, the following equation should be satisfied:

$$\frac{1}{\sqrt{LC}} = \omega, \tag{1}$$

where L is the inductance in henries, C is the capacitance in farads, and ω is the angular frequency in radians per second of the driving input signal.

Signal Adjusting

In an embodiment, in order to adjust the WPT device 200 back to resonance, the resonance tuning module 240 can adjust the frequency of the driving input signal within the WPT device 200. In other words, instead of adjusting the circuit components to shift the resonance to that of the input signal, the frequency of the input signal is adjusted to match the resonance of the circuit. This can be accomplished by shifting the frequency of the input signal up or down, and then monitoring the current or voltage for an amplitude increase. However, this approach runs the risk of causing equation (1) to no longer be satisfied at the receiving WPT load device. In other words, shifting the frequency of the driving signals to tune the transmitter may then cause the WPT receiving device to be out of tune. In which case, the transmitter efficiency may be improved, but then lost at the WPT receiver. Therefore, in an embodiment, the resonance tuning module 240 only operates in this manner when a load of a receiving WPT device is known. In particular, when a load is applied, the current draw by the WPT device 200 will be different relative to that of an unloaded state.

This is particularly useful for expanding a useable range of the system (power and efficiency) as a coupling coefficient k varies. For example, series resonance operates very well when k is small (e.g., 0.025-0.05) and Q is high (>100). However, not all WPT coil systems can ensure such a small k range. In particular, large transmitter coils ($Tx_{area} \approx 16 * Rx_{area}$) have a k-value generally within the range of 0.025-0.075, medium transmitter coils ($Tx_{area} \approx 4 * Rx_{area}$) have a k-value generally within the range of 0.04-0.15, and small transmitter coils ($Tx_{area} \approx 1.2 * Rx_{area}$) have a k-value generally within the range of 0.06-0.4. In order to make the system look more like a conventional transformer without requiring significant matching, the inductance and/or capacitances of the coupled devices can be adjusted, and/or the operating frequency can be adjusted. Specifically, if C and L are optimized for series resonance at the target frequency, then the transmitter can shift the target operating frequency by:

$$f1 = f0 \cdot \left(1 - \frac{1}{\sqrt{k+1}}\right). \tag{1}$$

This will detune the coil into a transformer-like mode and increase the output power for the target k when k>~0.05.

Capacitance Adjusting

Figure 3B:
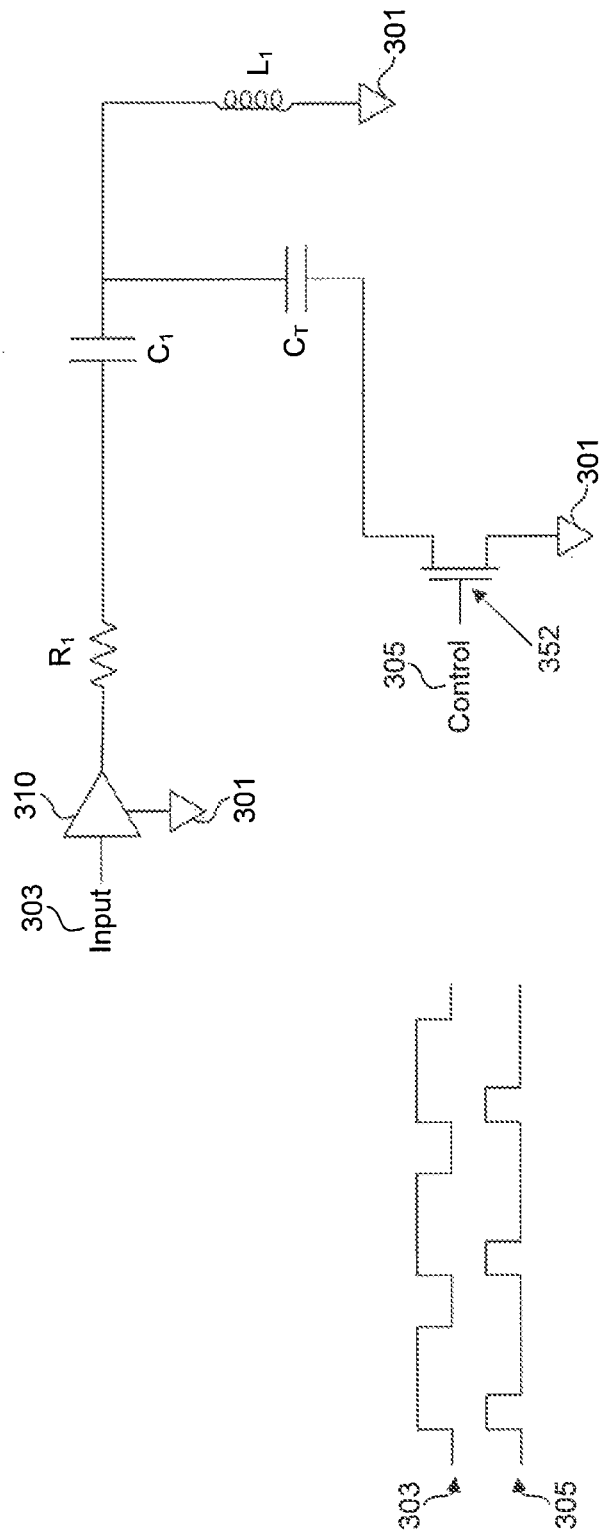

In another embodiment, in order to tune the WPT device 200 to resonance, the resonance tuning module 240 adjusts a capacitance of the coil module 220. FIG. 3B illustrates a circuit diagram of the exemplary coil module 300, adapted with capacitance altering control according to an embodiment. This exemplary coil module 300 includes timing capacitor $C_T$ connected to a control transistor 352. One of the source or drain terminal of the control transistor 352 is connected to a ground terminal 301. It should be noted that the control transistor 352 may have an inherent parasitic diode property as part of its functionality, which can be compensated by one or more additional diodes connected between the source and drain terminals of the control transistor 352.

By controlling the control transistor 352, the effective capacitance of the coil module circuit 300 can be adjusted, particular, turning on the control transistor causes the capacitance of the tuning capacitor $C_T$ to add to the capacitance of the system. Therefore, adjusting the duty cycle of the control transistor 352, causes a similar adjustment in the effective capacitance of the coil module 300. For example, assuming the input signal 303 is periodic as shown, then the control signal 305 of the control transistor 352 is also periodic and synchronous with the input signal 303. Therefore, adjusting the duty cycle of the control signal 305 adjusts the amount of $C_T$ that is added to the system over the period of the input signal 303. The higher the duty cycle, the more transistor 352 is on, and the more $C_T$ is added to the system.

To provide a numerical example, if the overall capacitance of the coil module system is 100 Farads, and the capacitance of the tuning capacitor $C_T$ is another 100 Farads, operating the control transistor 352 with a 50% duty cycle causes the overall capacitance of the coil module system to increase by 50% of the capacitance of the tuning capacitor $C_T$ to make an overall capacitance of 150 Farads. This will cause a similar adjustment in the resonance in the system according to equation (1), above.

Inductance Adjusting

Figure 3C:
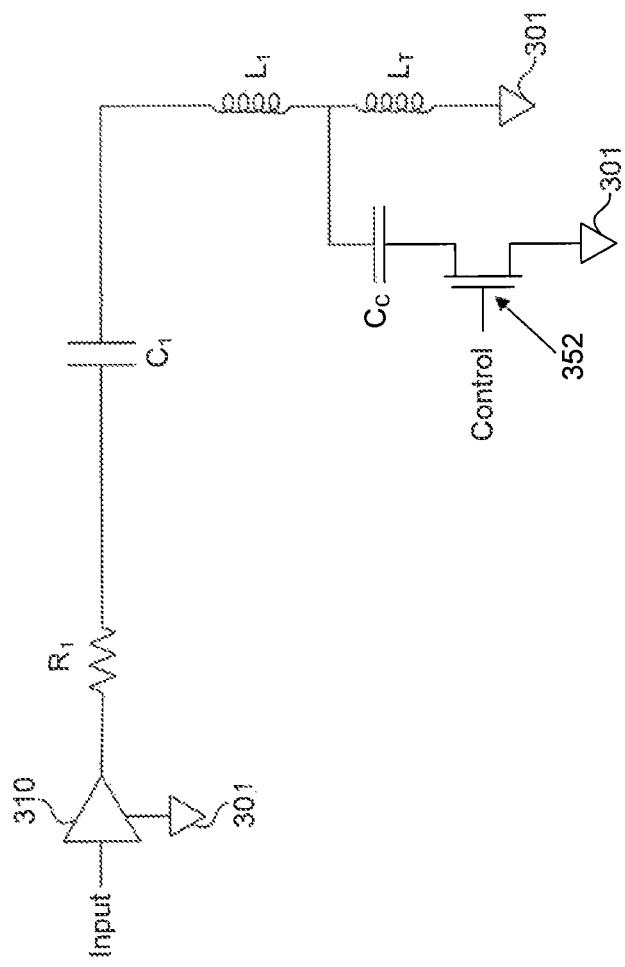

In another embodiment, the WPT device 200 can be re-tuned by adjusting the inductance of the device. For example, FIG. 3C illustrates a circuit diagram of the exemplary coil module 300, adapted with inductance altering circuitry according to an exemplary embodiment. This exemplary coil module 300 includes a tuning inductor $L_T$ connected in series with the primary coil $L_1$. A control capacitor $C_C$ is connected at node between the coil $L_1$ and the tuning inductor $L_T$, and is connected to a ground terminal 301 via a control transistor 352.

As with the capacitance adjusting, controlling the control transistor 352 causes the inductance of the coil module 300 to change. For example, when the control transistor 352 is off, the inductance of the tuning inductor $L_T$ is added to the inductance of the main coil $L_1$. Adjusting the duty cycle of the control transistor thus causes the inductance of the system to adjust inversely. For example, a 25% duty cycle will result in the overall effective inductance of the system being increased by 75% of the inductance of the tuning inductor $L_T$.

Figure 3D:
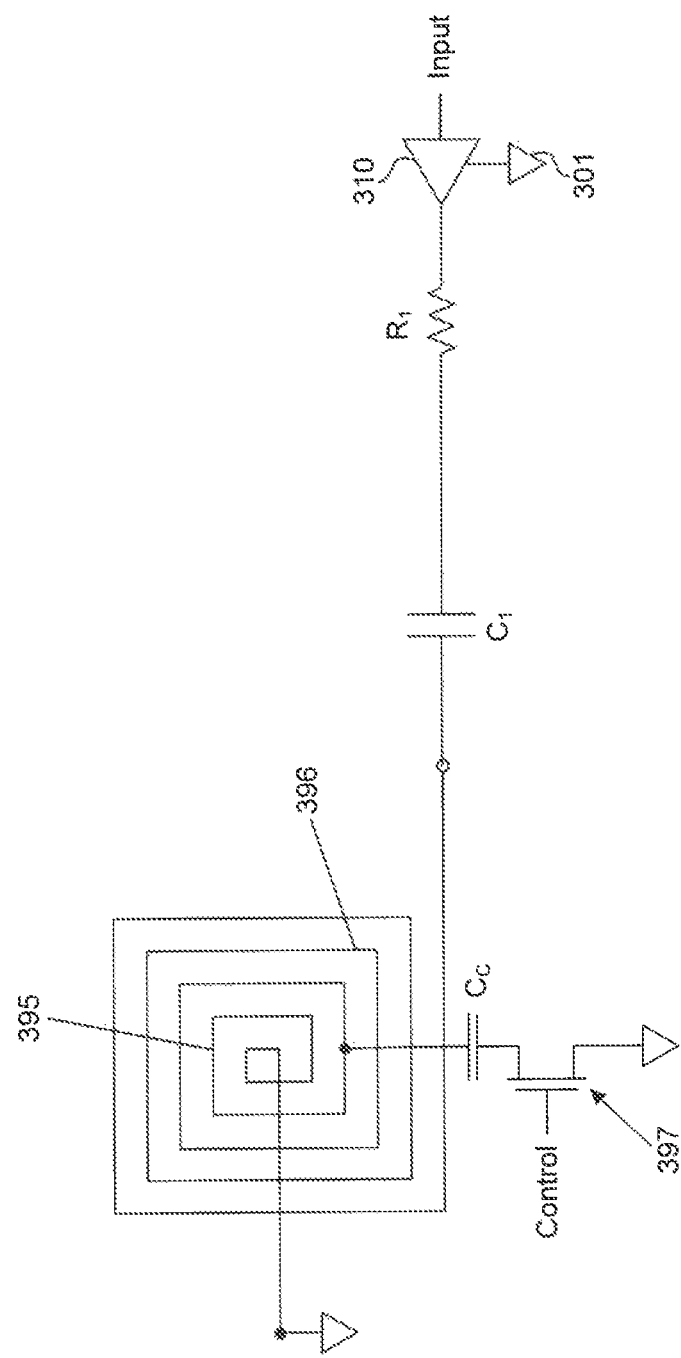

FIG. 3D illustrates an adjustable coil configuration that may be used to adjust the inductance of the coil module 220. A first coil portion 396 is series-connected with a second coil portion 395, with a ground switchably connected at their inter-connection through a control transistor 397. Turning on and off the control transistor 397 causes the number of turns of the overall coil to decrease and increase, respectively, thereby adjusting the overall inductance, and accordingly the resonant frequency of the WPT transmit or receiving circuit.

Further, in another embodiment, the coil is wrapped in a ferrite material that provides a shield to reduce electromagnetic interference from any metal shielding in the host device that may short-out, or reduce, the magnetic field of the coil. The ferrite material has a characteristic permeability that can increase or decrease the effective inductance of the coil based on its value. A voltage can be applied across the ferrite material, which changes the permeability of the ferrite material, and thereby varies the effective inductance of the coil.

Referring back to FIGS. 1 and 2, the power station 110 monitors the resonant state of the system 100, and performs any necessary tuning, including signal frequency or component tuning, to bring the system 100 back into resonance so that maximum power is transferred to the wirelessly chargeable device 150. In one embodiment, the tuning is preformed in-between loads being applied. In other words, the tuning is performed without a wireless device 150 actually being charged at the time of the tuning, so that the resonant circuit of the transmit device is tuned in isolation. For example, the transmit signal frequency can be dithered between loads, to determine if the frequency of the input signal is aligned with the actual resonance of the system. If not, then either the frequency of the input signal can be adjusted, or the transmit components of the power station can tuned, as described above. Further, if the signal frequency is used as a tuning option, then the frequency adjustment can be communicated to one or more chargeable devices 150 via the communications module 250.

Compensating Coupling Coefficient

A coupling coefficient relates to the mutual inductance between a transmitting coil and a receiving coil when the WPT device 200 is paired with another WPT device for power transfer. The coupling coefficient is typically between 1 and 0, and is a way to characterize the relationship between a certain orientation of respective transmitting and receiving coils. The coupling coefficient can have significant implications on the amount of power transfer. Therefore, adjusting the system parameters based on the coupling coefficient is also beneficial. For example, the spatial orientation between the chargeable device coil and the chargeable device can vary based on relative physical placement and conductive interference, thereby directly affecting the coupling coefficient. Therefore, it is desirable to adjust an inductance of the chargeable device coil inversely with variation in the coupling coefficient, to prevent too much or too little power transfer. It is noted that too much power transfer can result in high voltages that may damage the chargeable device. It is also noted that this type of inductance tuning is best done at the chargeable device (receiving) coil, instead of at the charging station device (transmitting) coil, especially in an environment of multiple chargeable device being serviced by a single charging station device. This is because the coupling coefficient can vary among the various chargeable devices.

Figure 4A:
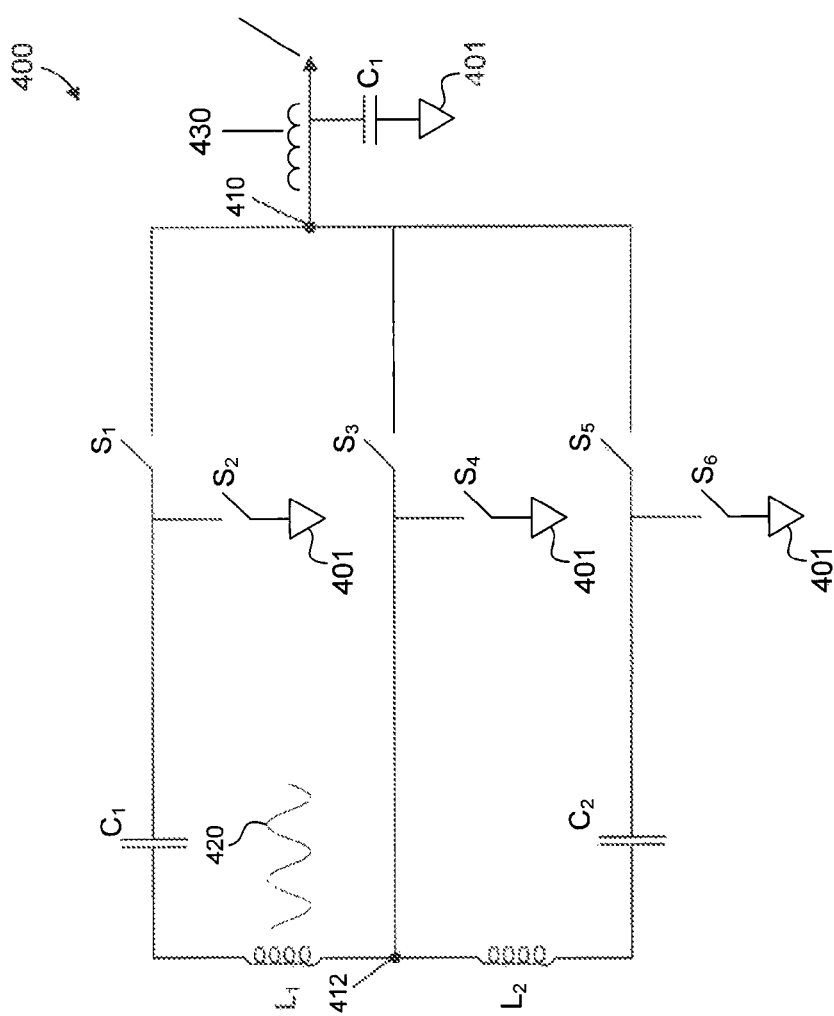
FIG. 4A illustrates an exemplary rectifier circuit that may be used in the coil module of a wirelessly chargeable device.

FIG. 4A illustrates an exemplary rectifier circuit 400 that may be used in the coil module 220 of the wirelessly-chargeable device 150. The rectifier circuit 400 includes coils L1 and L2 that are center-tapped at terminal 412, and a capacitors C1 and C2. The inductors L1 and L2 are connected to the output terminal 410 via a configuration of switches S1-S6. Switches S2, S4 and S6 are each connected to ground terminals 401.

When the coupling coefficient is detected to be small, it is preferred to have maximum inductance, so that both L1 and L2 are connected to terminal 410. In this scenario, switches S1, S2, S5 and S6 are active in a synchronous fashion to form a synchronous rectifier, while switches S3 and S4 are inactive (e.g. remain open). This results in a synchronous rectifier configuration receiving AC signal input 420 from the larger overall inductance L1 and L2, to produce rectified signal 430 at the output terminal 410. Alternatively, when the coupling coefficient is detected to be large, the inductance of the receiving WPT can be reduced. In this scenario, switches S1-S4 are active in a synchronous fashion to form a synchronous rectifier, while switches S5 and S6 are inactive (e.g. remain open). By configuring the coil circuit 400 using the various switches S1-S6 as discussed, any variation in coupling coefficient can be compensated so as to maintain an acceptable tolerance around the receiving power.

Figure 4B:
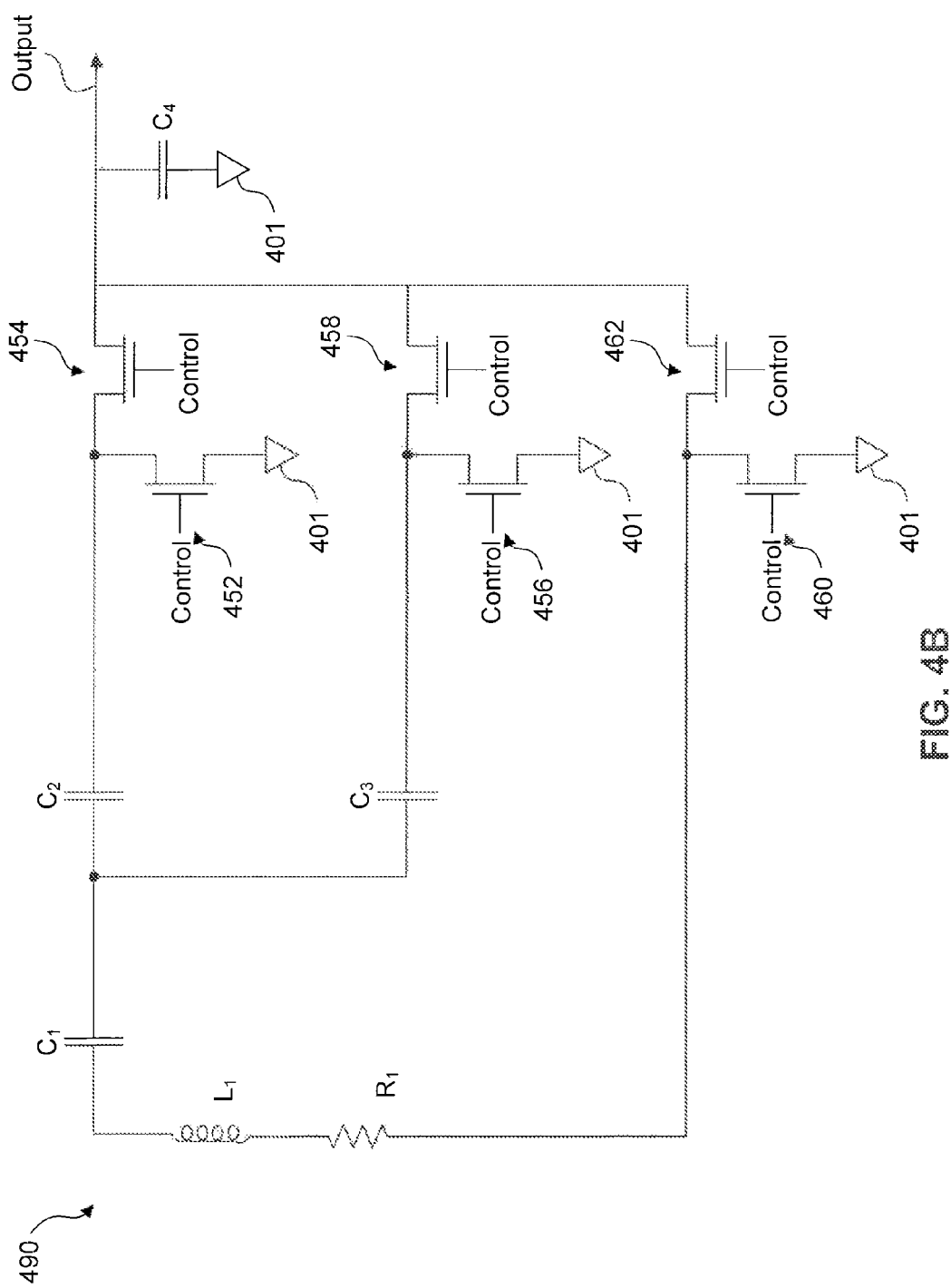
FIG. 4B illustrates a circuit diagram of an exemplary calibration circuit that may be used in the coil module of a wireless chargeable device.

The above rectifier circuit 400, described above, is particularly useful for dynamic range tuning. FIG. 4B illustrates a circuit diagram of a second synchronous rectifier 490.

As shown in FIG. 4B, the rectifier circuit 490 has an LRC circuit that includes resistor R1 and inductor L1 serially connected with capacitor C1 and some combination of capacitors C2 and C3. The capacitors C2 and C3 are connected in parallel between the capacitor C1 and an output node that is defined by the non-grounded terminal of the capacitor C4. The output node is also connected to a terminal of the resistor R1. A first switching arrangement connects the capacitor C2 to the output node. The first switching arrangement includes a first transistor 452 connected between the capacitor C2 and a ground terminal 401, and a second transistor 454 connected between the capacitor C2 and the output node. Likewise, a second switching arrangement connects the capacitor C3 to the output node. The second switching arrangement includes a first transistor 456 connected between the capacitor C3 and a ground terminal 401, and a second transistor 458 connected between the capacitor C3 and the output node. Likewise, a third switching arrangement connects the resistor R1 to the output node. The third switching arrangement includes a first transistor 460 connected between the resistor R1 and a ground terminal 401, and a second transistor 462 connected between the resistor R1 and the output node. It should be noted that various types of transistors or other electrical switching elements may substitute for the transistors 452-462 to achieve a substantially similar result.

Each of the transistors 452-462 has a gate terminal operated by one or more CONTROL signals. The CONTROL signals may be processed and issued from a controller or processor module (hot shown) within the device that controls the various transistors 452-462 to achieve a desired capacitive value in the rectifier circuit so as to adjust a resonant response of the rectifier. The resonant frequency is determined by the value of inductor L1 and the tunable combination of C2 and C3, as will be understood by those skilled in the art based on equation 1 discussed above.

Rectifier 490 operates as follows given an AC input signal received by coil L1, where the AC input signal may be a wireless power transfer signal. During a positive voltage cycle, the AC input signal on C1 will cause transistors 454 and 460 to conduct, thereby rectifying the voltage across coil L1 and R1 and passing a rectified voltage to the output capacitor C4. Transistors 452 and 462 remain cutoff during the positive voltage cycle. During a negative voltage cycle, the AC input signal on C1 will cause transistors 452 and 462 to conduct, thereby rectifying the voltage across coil L1 and R1 and passing a rectified voltage to the output capacitor C4. Transistors 454 and 460 remain cutoff during the positive voltage cycle. The middle branch is made up of transistors 456 and 458 and capacitor C3, and serves to tune the effective capacitance in the resonant LC, and therefore tune the resonant frequency of the rectifier 490. For example, control signals can be applied to transistors 456 and 458 so that they are synchronous with the operation of transistors 452 and 454, and therefore C3 appears in parallel with C2 when 458 is conducting. Further, the control of transistors 456 and 458 can be modulated to further refine the percentage of C3 that is combined with C2. In other words, the control of transistor 458 can be synchronous with that of transistor 454, but the duty cycle can be varied from 0% to 100% of the control of transistor 454, to determine a percentage of C3 that is in parallel with C2. More specifically, the duty cycle of the control of transistor 458 may be some percentage of the duty cycle of transistor 454, so that the effective capacitance of C3 is only a percentage of what could be achieved with a duty cycle that matched that of transistor 454.

Many other capacitive values can be achieved by controlling the various transistors to cycle on and off at predetermined rates. Further possible options for adjusting the capacitance include controlling the transistors with a switching pattern within single cycles, or over multiple cycles, in order to achieve even more diverse and fine-tuned capacitances within the rectifier. Also, the switching patterns for controlling the transistors need not be consistent from one period to another. In an embodiment, the switching patterns are performed synchronously with the clock cycles. In addition despite being described as part of the chargeable device, the same or similar circuit could be employed within a power station to order to calibrate and fine-tune output.

In other embodiments, changes in the coupling coefficient can be accounted for in other ways. For example, one option is to actually mismatch the systems. In other words, the transmitting WPT device can adjust its frequency to detune the system. This will cause the power transfer efficiency to reduce, thereby compensating for a large coupling coefficient (also known as a "k value"). Other options include adjusting the load resistance in a receiving WPT device, or employing a DC-to-DC converter to adjust the output voltage of the coil.

For example, when the coupling coefficient varies, the load resistance can be modified. This can be done, for example, by adjusting the resistance of resistor R1 (as shown in FIG. 2) to optimize for maximum power transfer efficiency. When changing the resistance is not preferred or available, an impedance transformation circuit, such as the DC-to-DC converter can be used to make the impedance seen by the transmitter different from the actual impedance of the receiver.

Referring to FIG. 2, in each of the above configurations, it will be beneficial to have a communication module 250 capable of communicating with another WPT device via antenna 255. When adjustment is controlled by the transmitting WPT device (such as in the case of frequency adjusting), the transmitting WPT device can receive information from the receiving WPT device relating to the power transfer statistics and characteristics. Once the frequency has been adjusted, the newly tuned frequency can be communicated by the transmitting WPT device to the receiving WPT device. This information can be forwarded to the controller module 210 for processing and a determination as to how to adjust. Similarly, when the adjustment control is performed by the receiving WPT device (as in the case of load adjusting), the transmitting WPT device can generate power transfer statistics and characteristics in its control module 210 and forward that information to the receiving WPT device via the communication module 250 and antenna 255. Once the load has been adjusted, the newly tuned load can be communicated from the receiving WPT device to the transmitting WPT device.

Using the above, WPT devices can measure/detect and adjust power transfer characteristics in a number of different ways. This allows for more efficient power transfer while maintaining high resonance in the system.

Diagnostic Services and Error Notification

During or before charging, the transmit power station and the chargeable device have a known geometry and/or positioning between them, which can be utilized for performing various diagnostics and analysis. In particular, the chargeable device should be in close proximity to, or even resting on top of the power station. Accordingly, the distance and geometry between the transmit and receive coils should be known, as well as the magnetic field power, among other parameters. Therefore, various transmission Characteristics, such as coupling coefficient, H-field, transmit power, received power, etc., should have measurable expected values based on this known information.

Based on this information, the transmit power station may perform a diagnostic routine that measures one or more of the expected transmission characteristics of the chargeable device. In an example, the transmit power station may measure or determine the coupling coefficient between the transmit power station and the chargeable device. For example, the power received at the receiving coil is proportional to:

$$\text{Prec} \propto i^2 \cdot \omega^2 \cdot (k\sqrt{L_{Tx} \cdot L_{Rx}}) \qquad (2)$$

where $i^2$: transmit coil current;
$\omega^2$: signal frequency;
$L_{Tx}$: transmit coil inductance;
$L_{Rec}$: receiving coil inductance;
k: coupling coefficient between transmit and receiving coils.

Accordingly, $L_{Tx}, L_{Rec}, \omega^2$ are predetermined design parameters, and the remaining parameters can be measured or determined. For example, coil current i and power received Prec can be measured at the transmitter and receiver respectively, leaving the coupling coefficient to be solved via the equation. Alternatively, the coupling coefficient can be measured directly. If the determined coupling coefficient is different than its expected value, as determined by the geometry, by more than a threshold value, then the transmit power station performs a notification.

The transmit power station performs the notification by utilizing one or more of its available communications systems to notify the chargeable device and/or a third party of the error. The power station's communications systems can include in-band communications (e.g., WPT communications) and/or out-of-band communications Bluetooth, WiFi, etc.). When transmitting diagnostic information to a third party, the power station can forward the diagnostic notification via an internet or server backhaul. Interested third parties may include a service provider and/or manufacturer, among others.

A central server or data hub may be particularly useful for collecting, compiling, and organizing many types of power transfer information, as well as to provide support to the power stations and/or chargeable devices. For example, alter receiving enough error notifications from a particular power station, the central server can flag that station as being "out-of-service," and may schedule the station for repair/replacement by a station manager.

In addition to receiving error notifications, the central server may also be configured to receive general power transfer statistics from the power stations in communication therewith. For example, such power stations may, after making a successful power transfer connection with a chargeable device, upload connection parameters and configurations to the central server. Such parameters and configurations may include a model of the receiving device, power transfer standard, frequency, transfer efficiency, transfer amount, etc. The central server can compile and organize this information for future use by the power station or other power stations in order to enhance power transfer in the power station, for example, by reducing connection time, calibration time, increasing calibration accuracy, etc.

It should be noted that this diagnostic and notification configuration can be reversed, where the chargeable device performs a diagnostic service for the transmit power station by measuring any of the above characteristics and comparing the measured characteristics to expected values. The chargeable device can then notify the power station and/or third party of any errors. Further, this diagnostic can be conducted in conjunction with the diagnostic performed by the power station.

It should further be noted that the diagnostic routine is not limited to the wireless power transfer, but can be extended to out-of-band communications, including WiFi, Bluetooth, and NFC. In doing so, the transmit power station includes corresponding transmitters and receivers associated with out-of-band communications. For example, the transmit power station may include a WiFi transceiver to perform a diagnostic on the WiFi capabilities of the chargeable device in concert with the wireless power transfer. Likewise this can be extended to Bluetooth, NFC, and other communications systems.

Additional Configurations

This disclosure repeatedly references a WPT device and a chargeable device or receiver device. It will be understood that each of the WPT device and the chargeable/receiver device may include one or more coils. Further, the chargeable/receiver device may function both as a power receiver and as a power transmitter for transferring power to another chargeable device. Therefore, any of the above descriptions relating to the WPT device can similarly be applied to the chargeable/receiver device. In addition, each of the functions/configurations described herein can be applied on a per coil or multi-coil basis and on a per standard or multi standard system in each of the WPT device and the chargeable/receiver device.

Exemplary Method for Performing Resonant Tuning

Figure 5:
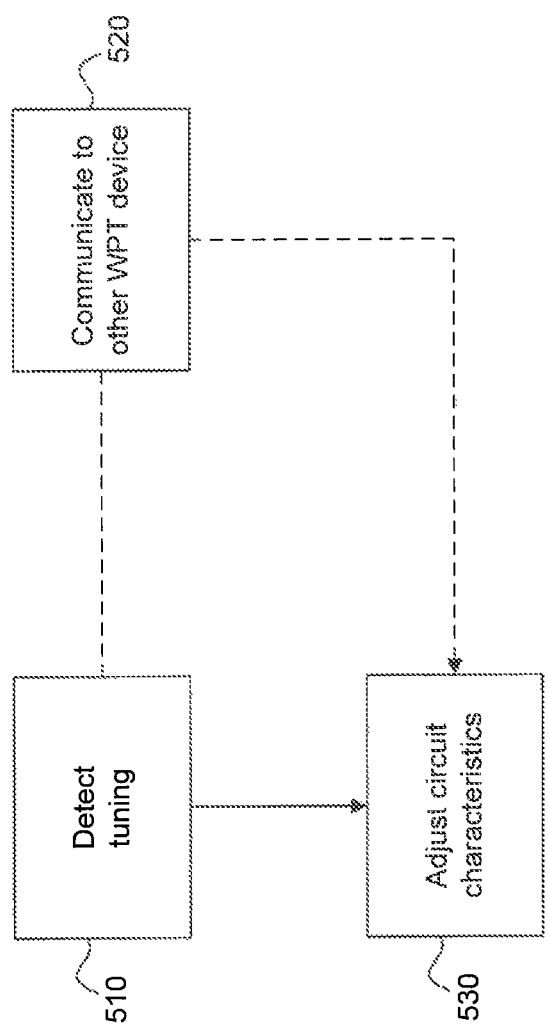
FIG. 5 illustrates a block diagram of a method for maintaining resonant tuning in a WPT device with another WPT device according to an exemplary embodiment.

FIG. 5 illustrates a block diagram of a method for maintaining resonant tuning in a WPT device with another WPT device according to an exemplary embodiment.

Initially, the WPT device must detect the tuning state of the WPT system (510). This can be done by measuring the current in its own coil module, by measuring a voltage, and/or by comparing phases of the voltage and the current systems, as discussed in detail above.

Once the tuning detection has been performed, it may be necessary to communicate information about the tuning, such as load, phase offsets, etc., to the other WPT device to be used in its adjustment. This occurs at least when the WPT device that detects the tuning is different from the WPT device performing the adjustment. In this situation, the WPT device communicates necessary information, such as that described above, to the other WPT device (520).

Once the necessary information has been communicated to the other WPT device, or if the adjustment is to be performed by the same WPT device that performed the tuning detection, circuit characteristics can then be adjusted to effect power transfer efficiency modifications and/or resonant tuning (530). Power efficiency can be adjusted by adjusting frequency in the transmitting WPT device and/or by changing a configuration of a coil circuit in the receiving WPT device, as discussed above. Tuning can be performed by modifying signal characteristics (e.g., frequency), adjusting effective capacitance or inductance in the transmitting WPT device, adjusting load and/or configuring a coil circuit in the receiving WPT device, as discussed in detail above.

Those skilled in the relevant art(s) will recognize that the above method can additionally or alternatively include any of the functionality of the WPT device 200 discussed above, as well as any of its modifications. Further, the above description of the exemplary method should neither be construed to limit the method nor the description of the WPT device 200.

Exemplary Method of Performing a Diagnostic in a WPT System

Figure 6:
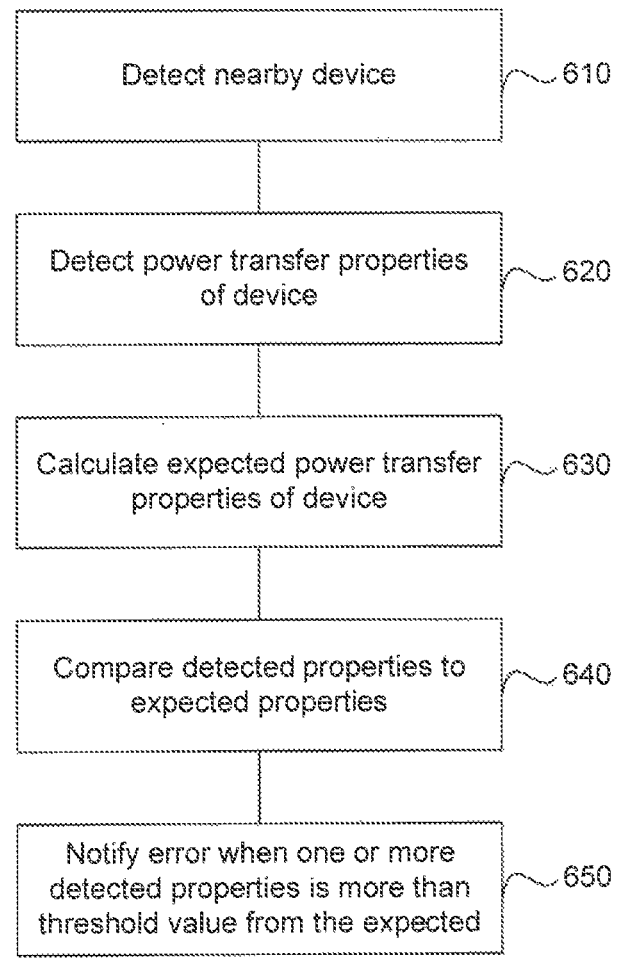
FIG. 6 illustrates a flowchart diagram of an exemplary method for performing a diagnostic in a wireless power transfer system.

FIG. 6 illustrates a flowchart diagram of an exemplary method for performing a diagnostic in a wireless power transfer system by a power transfer station.

Initially, the power transfer station detects a nearby chargeable device (610). The chargeable device will have a substantially known geometry with respect to the power station. Once detected, the power station can then, utilizing the known geometry, detect one or more transmission properties of the device (620). Such transmission properties may include, H-field, transmit power, transmit current, received power, etc. Utilizing the substantially known geometry and design parameters (transmit and receive coil inductance), the power station calculates expected values of the unknown transmission properties (630), such as the coupling coefficient.

The power station then compares the detected values of the properties to the calculated expected values of those properties (640). If the detected values differ from the expected values by a threshold amount, the power station performs an error notification (650). The error notification may be transmitted in-band or out-of-band to the chargeable device and/or an interested third party, such as a service provider or manufacturer.

It should be understood that the above method can likewise be performed by the chargeable device on transmission properties of the power station. Those skilled in the relevant art(s) will recognize that the above method can additionally or alternatively include any of the functionality of the WPT device 200 discussed above, as well as any of its modifications. Further, the above description of the exemplary method should neither be construed to limit the method nor the description of the WPT device 200.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
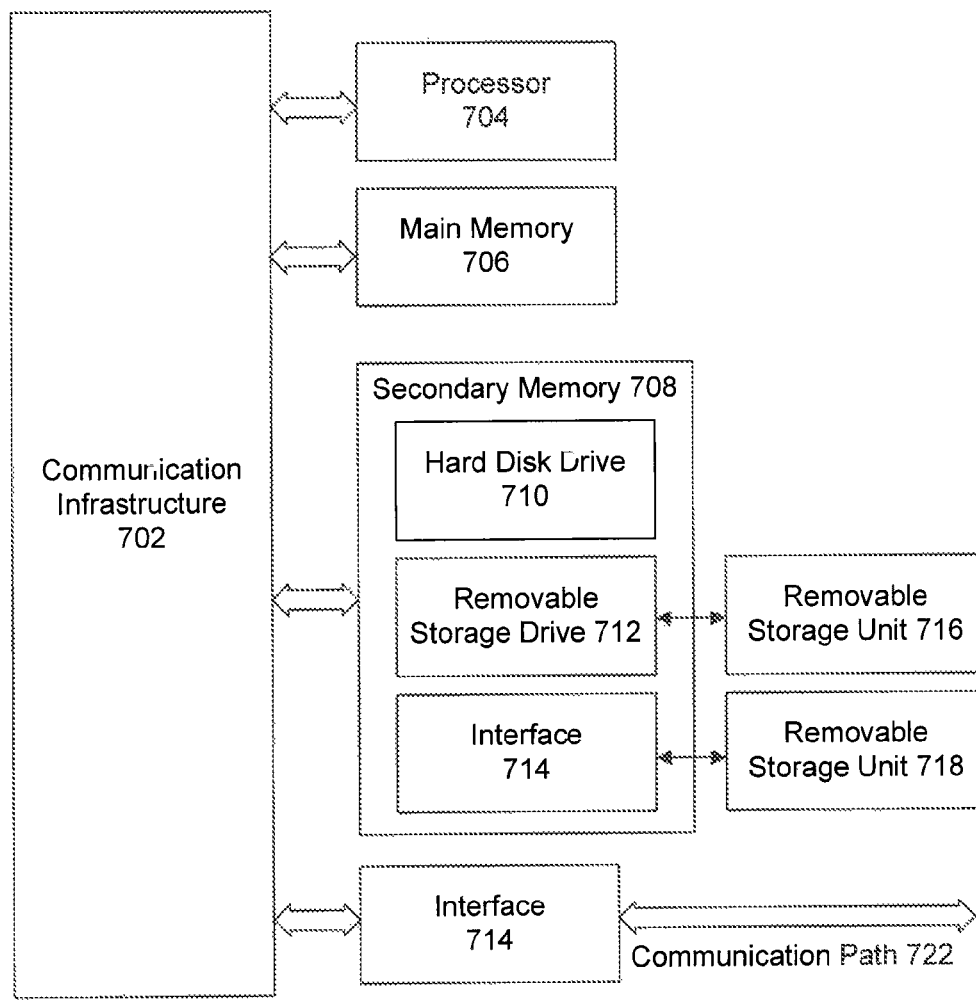
FIG. 7 illustrates a block diagram of an exemplary general purpose computer system.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. One or more of the modules depicted in the previous figures can be at least partially implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow soft ware and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments. Further, the invention should be defined only in accordance with the following claims and their equivalents.

What is claimed is:

1. A wireless power transfer device, comprising:
   a coil module configured to send or receive wireless power transfer signals, the coil module including a coil circuit;

a tuning observer module configured to detect a tuning state of the wireless power transfer device, the tuning state being one of a tuned state or an out-of-tune state; and a resonance controller module configured to adjust at least one parameter of the coil module in response to the tuning observer module detecting an out-of-tune state in order to provide the tuned state, wherein the resonance controller module is further configured to determine whether a load of a recipient device is known, and in response to a determination that the load of the recipient device is not known, select the at least one parameter to be an adjustable parameter of the coil circuit, and in response to a determination that the load of the recipient device is known, select the at least one parameter to be a frequency of an input signal input to the coil module.

2. The wireless power transfer device of claim 1, wherein the coil circuit includes a first resistor, a first capacitor, and a first inductor connected in series.

3. The wireless power transfer device of claim 2, wherein the tuning observer module is configured to detect the tuning state based on a current passing through the first resistor.

4. The wireless power transfer device of claim 2, wherein the tuning observer module includes a voltage detector connected at a node between the first capacitor and the first inductor, and wherein the tuning observer module detects the tuning state based on a voltage detected by the voltage detector.

5. The wireless power transfer device of claim 2, wherein the tuning observer module includes a second inductor, a second resistor, and a voltage detector connected in parallel.

6. The wireless power transfer device of claim 5, wherein the second inductor of the tuning observer module is inductively coupled to the first inductor of the coil circuit.

7. The wireless power transfer device of claim 6, wherein the tuning observer module detects the tuning state based on a voltage detected by the voltage detector.

8. The wireless power transfer device of claim 2, wherein the resonance controller module includes a tuning capacitor and a control transistor connected in series, the tuning capacitor being connected to a node between the first capacitor and the first inductor of the coil circuit.

9. The wireless power transfer device of claim 8, wherein the resonance controller module is configured to tune the wireless power transfer device by adjusting a duty cycle of the control transistor.

10. The wireless power transfer device of claim 2, wherein the resonance controller module includes a tuning inductor serially connected to the first inductor, and a control transistor connected to a node between the first inductor and the tuning inductor.

11. The wireless power transfer device of claim 10, wherein the resonance controller module is configured to tune the wireless power transfer device by adjusting a duty cycle of the control transistor.

12. A wireless power transfer device, comprising:
a coil module configured to send or receive wireless power transfer signals;
a tuning observer module configured to detect a tuning state of the wireless power transfer device, the tuning state being one of a tuned state or an out-of-tune state; and
a resonance controller module configured to adjust at least one parameter of the coil module in response to the tuning observer module detecting an out-of-tune state in order to provide the tuned state, wherein the coil module includes a coil circuit having a first resistor, a first capacitor, and a first inductor connected in series, the first inductor including a plurality of windings, wherein the resonance controller module includes a control transistor connected to the first inductor at a node so as to separate the plurality of windings into a first number of windings and a second number of windings, and wherein the resonance controller is configured to tune the wireless power transfer device by turning the control transistor on or off.

13. A wireless power transfer device, comprising:
a coil module configured to send wireless power transfer signals;
a system monitor module configured to detect an absence of a calibration-prohibitive event;
a tuning observer module configured to, in response to the detection of the absence of the calibration-prohibitive event, detect a tuning state of the wireless power transfer device, the tuning state being one of a tuned state or an out-of-tune state; and
a resonance controller module configured to, in response to the tuning observer module detecting the out-of-tune state, adjust at least one parameter of the coil module in order to produce the tuned state, wherein the resonance controller module is further configured to determine whether a load of a recipient device is known, and in response to a determination that the load of the recipient device is not known, select the at least one parameter to be an adjustable parameter of the coil module, and in response to a determination that the load of the recipient device is known, select the at least one parameter to be a frequency of an input signal input to the coil module.

14. The wireless power transfer device of claim 13, wherein the coil module includes a resistor, and
wherein the tuning observer module detects the tuning state of the wireless power transfer device by measuring a current passing through the resistor and comparing the current to a predetermined threshold.

15. The wireless power transfer device of claim 13, wherein the coil module includes a capacitor, and
wherein the tuning observer module detects the tuning state of the wireless power transfer device by measuring a voltage across the capacitor and comparing the voltage to a predetermined threshold.

16. The wireless power transfer device of claim 13, wherein the coil module includes a resistor and a capacitor connected in series, and
wherein the tuning observer module is configured to measure a voltage across the capacitor and a current passing through the resistor.

17. The wireless power transfer device of claim 16, wherein the tuning observer module detects the tuning state of the wireless power transfer device based on a phase difference between the voltage and the current.

18. The wireless power transfer device of claim 17, wherein the tuning observer module detects the tuned state when the phase difference is within a predetermined window of zero degrees, and
wherein the tuning observer module detects the out-of-tune state when the phase difference is outside the predetermined window.

19. The wireless power transfer device of claim 13, wherein the resonance controller module is configured to perform a first calibration technique when the load is known and perform a second calibration technique when the load is unknown,
   wherein the first calibration technique includes adjusting the frequency of the input signal and measuring a response in at least one circuit component.

20. The wireless power transfer device of claim 19, wherein, as part of the first calibration technique, the response is measured by measuring a current passing through a resistor of the resonance controller module.

* * * * *